US012619513B2

(12) United States Patent
    Ramaiah et al.

(10) Patent No.: US 12,619,513 B2
(45) Date of Patent: May 5, 2026

(54) VALIDATION OF FLEXIBLE IHS HARDWARE CONFIGURATIONS

(71) Applicant: Dell Products, L.P., Round Rock, TX (US)

(72) Inventors: Dharma Bhushan Ramaiah, Bangalore (IN); Shinose Abdul Rahiman, Bangalore (IN); Rama Rao Bisa, Bangalore (IN); Mini Thottunkal Thankappan, Bangalore (IN); Vineeth Radhakrishnan, Palakkad (IN); A Anis Ahmed, Bangalore (IN); Jason Matthew Young, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 280 days.

(21) Appl. No.: 18/509,665

(22) Filed: Nov. 15, 2023

(65) Prior Publication Data

US 2025/0156295 A1    May 15, 2025

(51) Int. Cl.
    *G06F 11/32*      (2006.01)
    *G06F 11/30*      (2006.01)
    *G06F 21/73*      (2013.01)

(52) U.S. Cl.
    CPC ........ *G06F 11/327* (2013.01); *G06F 11/3051* (2013.01); *G06F 21/73* (2013.01)

(58) Field of Classification Search
    CPC ..... G06F 11/327; G06F 11/3051; G06F 21/73
    USPC ......................................................... 726/34
    See application file for complete search history.

(56) References Cited

U.S. PATENT DOCUMENTS

| | | | |
|---|---|---|---|
| 10,311,224 B1* | 6/2019 | Farhan .................. | H04L 9/0897 |
| 2004/0025010 A1* | 2/2004 | Azema ................ | G06F 12/1408 |
| | | | 713/156 |
| 2006/0048222 A1* | 3/2006 | O'Connor ............... | G06F 21/57 |
| | | | 726/22 |
| 2007/0061227 A1* | 3/2007 | Gimpl .................. | G06Q 10/087 |
| | | | 705/28 |
| 2016/0378990 A1* | 12/2016 | Goodman ............. | G06F 21/572 |
| | | | 726/19 |
| 2018/0239929 A1* | 8/2018 | Shell ...................... | G06F 9/4406 |
| 2019/0089594 A1* | 3/2019 | Jubran ................ | H04L 41/0856 |
| 2019/0392148 A1* | 12/2019 | Ganesan .............. | G06F 9/4411 |
| 2020/0293420 A1* | 9/2020 | Ayolasomyajula .......................... |  |
| | | | G06F 11/3051 |
| 2021/0073003 A1* | 3/2021 | Jacquin ................... | G06F 21/44 |

(Continued)

*Primary Examiner* — Dereena T Cattungal
(74) *Attorney, Agent, or Firm* — Fogarty LLP

(57) ABSTRACT

Systems and methods are provided for supporting validation of flexible configurations of hardware components installed in IHSs (Information Handling Systems). During factory provisioning of an IHS, a factory-signed inventory certificate is uploaded to the IHS that identifies factory-installed hardware of the IHS, and that also includes designations for each of the factory-installed hardware components as required or optional components. Upon deployment of the IHS, validation procedures of the IHS use the inventory certificate to validate the detected IHS hardware as factory-installed hardware. When a hardware component specified in the inventory certificate as optional is not present in the detected hardware components, booting of the IHS may continue. When a hardware component specified in the inventory certificate as required is not present in the detected hardware components, a validation failure is signaled.

20 Claims, 8 Drawing Sheets

100

(56)                    References Cited

U.S. PATENT DOCUMENTS

| | | | |
|---|---|---|---|
| 2022/0067139 A1* | 3/2022 | Rodriguez Bravo | ........................ G06F 9/4406 |
| 2022/0092187 A1* | 3/2022 | Tonry | ...................... G06F 21/33 |
| 2022/0207126 A1* | 6/2022 | Young | ................... H04L 9/3268 |
| 2022/0207145 A1* | 6/2022 | Young | ................... G06F 21/575 |
| 2022/0207186 A1* | 6/2022 | Young | ................... G06F 21/64 |
| 2023/0088422 A1* | 3/2023 | Mintz | ..................... G06F 21/72 726/34 |

* cited by examiner

200

300

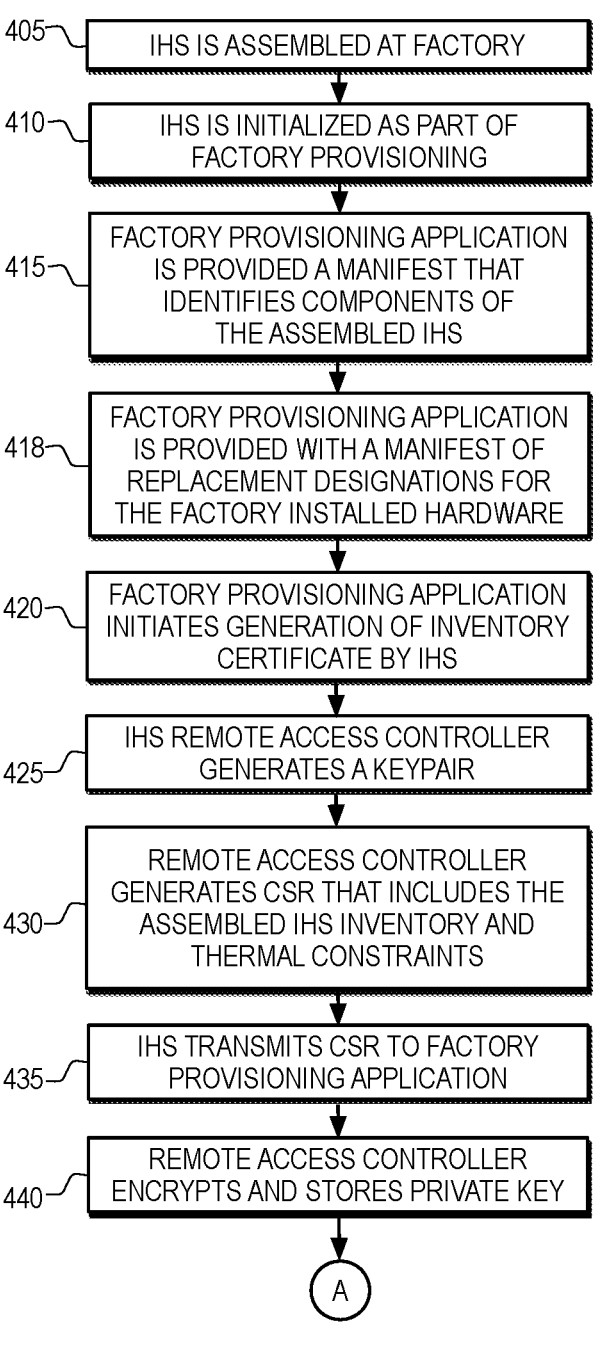

405 — IHS IS ASSEMBLED AT FACTORY

410 — IHS IS INITIALIZED AS PART OF FACTORY PROVISIONING

415 — FACTORY PROVISIONING APPLICATION IS PROVIDED A MANIFEST THAT IDENTIFIES COMPONENTS OF THE ASSEMBLED IHS

418 — FACTORY PROVISIONING APPLICATION IS PROVIDED WITH A MANIFEST OF REPLACEMENT DESIGNATIONS FOR THE FACTORY INSTALLED HARDWARE

420 — FACTORY PROVISIONING APPLICATION INITIATES GENERATION OF INVENTORY CERTIFICATE BY IHS

425 — IHS REMOTE ACCESS CONTROLLER GENERATES A KEYPAIR

430 — REMOTE ACCESS CONTROLLER GENERATES CSR THAT INCLUDES THE ASSEMBLED IHS INVENTORY AND THERMAL CONSTRAINTS

435 — IHS TRANSMITS CSR TO FACTORY PROVISIONING APPLICATION

440 — REMOTE ACCESS CONTROLLER ENCRYPTS AND STORES PRIVATE KEY

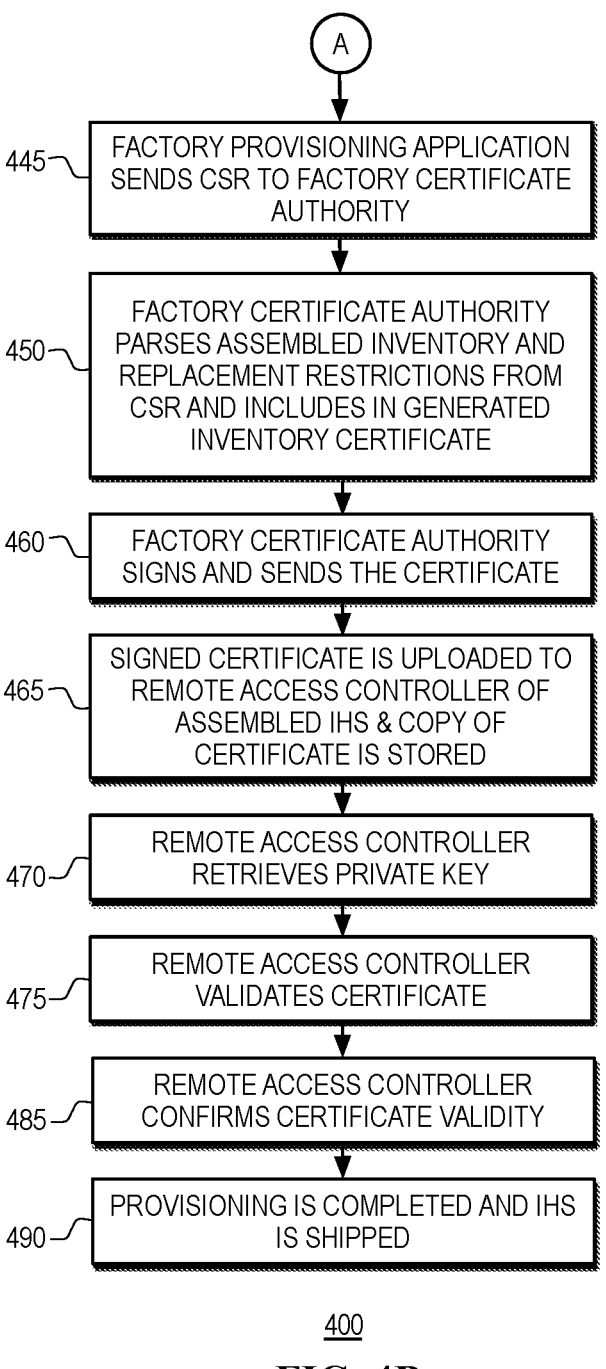

Ⓐ

445 — FACTORY PROVISIONING APPLICATION SENDS CSR TO FACTORY CERTIFICATE AUTHORITY

450 — FACTORY CERTIFICATE AUTHORITY PARSES ASSEMBLED INVENTORY AND REPLACEMENT RESTRICTIONS FROM CSR AND INCLUDES IN GENERATED INVENTORY CERTIFICATE

460 — FACTORY CERTIFICATE AUTHORITY SIGNS AND SENDS THE CERTIFICATE

465 — SIGNED CERTIFICATE IS UPLOADED TO REMOTE ACCESS CONTROLLER OF ASSEMBLED IHS & COPY OF CERTIFICATE IS STORED

470 — REMOTE ACCESS CONTROLLER RETRIEVES PRIVATE KEY

475 — REMOTE ACCESS CONTROLLER VALIDATES CERTIFICATE

485 — REMOTE ACCESS CONTROLLER CONFIRMS CERTIFICATE VALIDITY

490 — PROVISIONING IS COMPLETED AND IHS IS SHIPPED

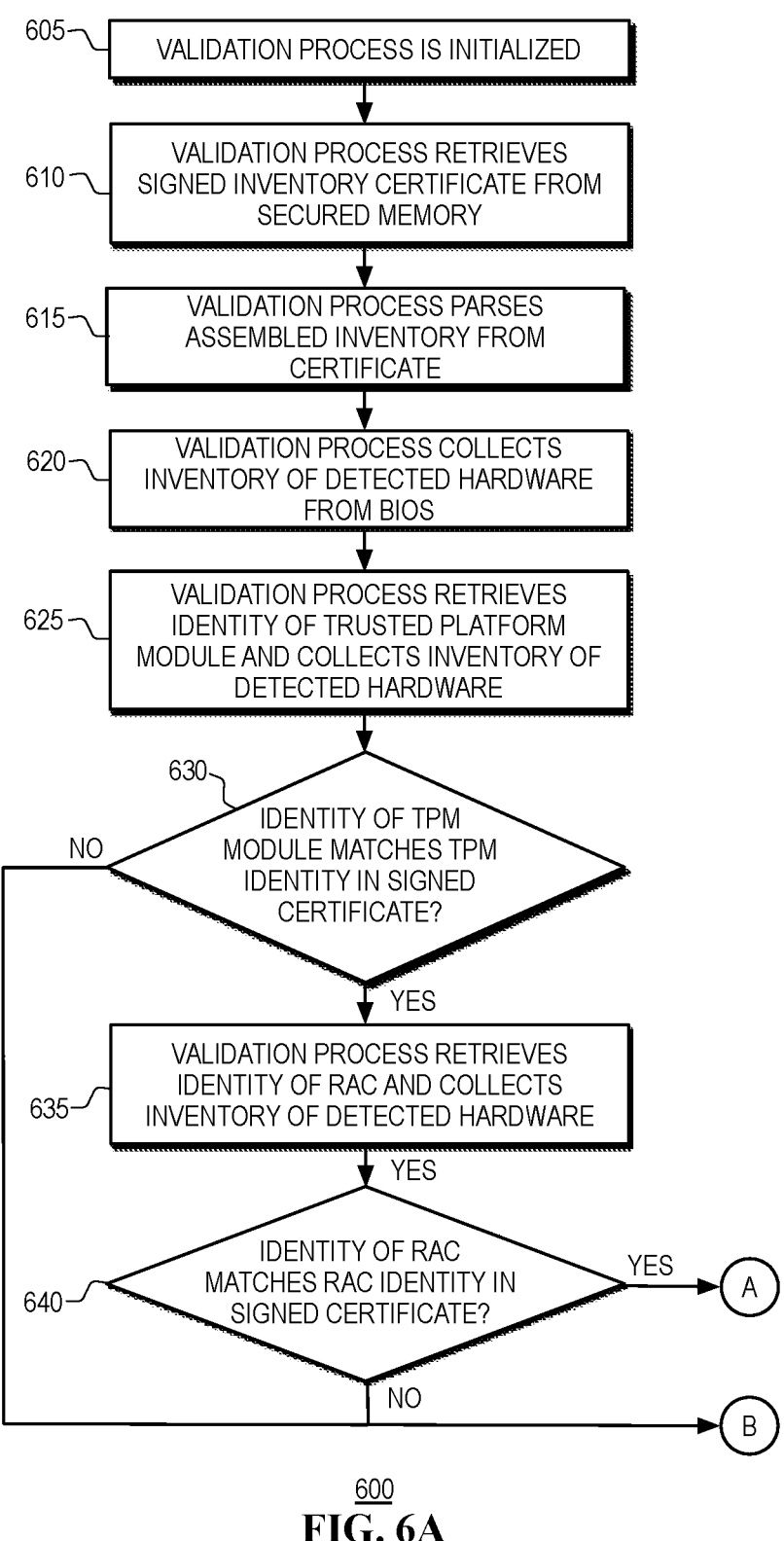

605 — VALIDATION PROCESS IS INITIALIZED

610 — VALIDATION PROCESS RETRIEVES SIGNED INVENTORY CERTIFICATE FROM SECURED MEMORY

615 — VALIDATION PROCESS PARSES ASSEMBLED INVENTORY FROM CERTIFICATE

620 — VALIDATION PROCESS COLLECTS INVENTORY OF DETECTED HARDWARE FROM BIOS

625 — VALIDATION PROCESS RETRIEVES IDENTITY OF TRUSTED PLATFORM MODULE AND COLLECTS INVENTORY OF DETECTED HARDWARE

630 — IDENTITY OF TPM MODULE MATCHES TPM IDENTITY IN SIGNED CERTIFICATE?

NO

YES

635 — VALIDATION PROCESS RETRIEVES IDENTITY OF RAC AND COLLECTS INVENTORY OF DETECTED HARDWARE

YES

640 — IDENTITY OF RAC MATCHES RAC IDENTITY IN SIGNED CERTIFICATE?

YES → A

VALIDATION OF FLEXIBLE IHS HARDWARE CONFIGURATIONS

CROSS REFERENCE TO RELATED APPLICATIONS

Related subject matter is contained in co-pending U.S. patent application Ser. No. 18/512,231, entitled "Enforcement of Factory-Provisioned Restrictions on Modifications to IHS Hardware," filed on Nov. 17, 2023, the disclosure of which is hereby incorporated by reference.

FIELD

The present disclosure relates generally to Information Handling Systems (IHSs), and relates more particularly to supporting secure modifications to IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some types of IHSs, such as mobile phones and tablets, are typically manufactured in large quantities and with few variations. For instance, for a particular model of mobile phone or tablet, hundreds of thousands of identical, or nearly identical, devices may be manufactured. Other types of IHSs, such as rack-mounted servers, are manufactured in much smaller quantities and are frequently manufactured and customized according to specifications provided by a specific customer that has contracted for the manufacture and delivery of the server. In such instances, a customer may specify various hardware and/or software customizations that configure the server to support specific functionality. For example, a customer may contract for manufacture and delivery of a server that includes security adaptations that will enable the server to quickly and securely process artificial intelligence computations. Once an IHS has been received and deployed, a customer may make modifications to the hardware and software of the IHS in order to adapt it for a particular computing task or a particular physical environment. In some scenarios, such as within a data center, rack-mounted server IHSs may include replaceable hardware components that are easily removed from the IHS and replaced, in some instances while the operations of the IHS continue.

SUMMARY

In various embodiments, systems and methods include an IHS (Information Handling System) that includes: one or more processors; one or more memory devices coupled to the processors, the memory devices storing computer-readable instructions that, upon execution by the processors, cause a validation process of the IHS to: retrieve a factory-provisioned inventory certificate that specifies factory-installed hardware components of the IHS, wherein the inventory certificate comprises a designation for each of the factory-installed hardware components as required or optional; identify a plurality of hardware components of the IHS that have been detected; signal booting of the IHS without an optional hardware component when a factory-installed hardware component designated in the inventory certificate as optional is not present in the plurality of detected hardware components of the IHS; and signal a validation failure when a factory-installed hardware component specified in the inventory certificate as required is not present in the plurality of detected hardware components of the IHS.

In some embodiments, the factory-provisioned inventory certificate is stored to a persistent memory of the IHS during factory-provisioning of the IHS. In some embodiments, the designation of a hardware component as required in the inventory certificate comprises a requirement for the exact factory-installed hardware component specified in the inventory certificate. In some embodiments, the designation of a hardware component as required in the inventory certificate comprises a requirement for a compatible hardware component. In some embodiments, the requirement for a compatible hardware component comprises a requirement for a specific model of hardware component. In some embodiments, the requirement for a compatible hardware component comprises a requirement for a hardware component with a thermal rating within a specific range. In some embodiments, the requirement for a compatible hardware component comprises a requirement for a hardware component that is identified by a device identity certificate. In some embodiments, the factory-installed hardware components designated as required comprise hardware components that form a hardware root-of-trust of the IHS. In some embodiments, the hardware root-of-trust of the IHS comprises hardware components that operate using validated firmware instructions. In some embodiments, booting of the IHS without an optional hardware component is disabled until the factory-provisioned inventory certificate is used to confirm the IHS was received including all of the factory-installed hardware components designated as required. In some embodiments, booting of the IHS without an optional hardware component is further disabled until the factory-provisioned inventory certificate is used to confirm the IHS was received including all of the factory-installed hardware components designated as optional. In some embodiments, the booting of the IHS without an optional hardware component is disabled by a remote access controller of the IHS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIG. 4A is a flowchart describing certain steps of a method, according to some embodiments, for assembly and provisioning of an IHS in a manner that supports validation of flexible configurations of hardware components installed in the IHS.

FIG. 4B is a flowchart that is a continuation of FIG. 4A.

FIG. 6A is a flowchart describing certain steps of a method, according to some embodiments, for validation of flexible configurations of hardware components installed in an IHS.

DETAILED DESCRIPTION

Figure 1:
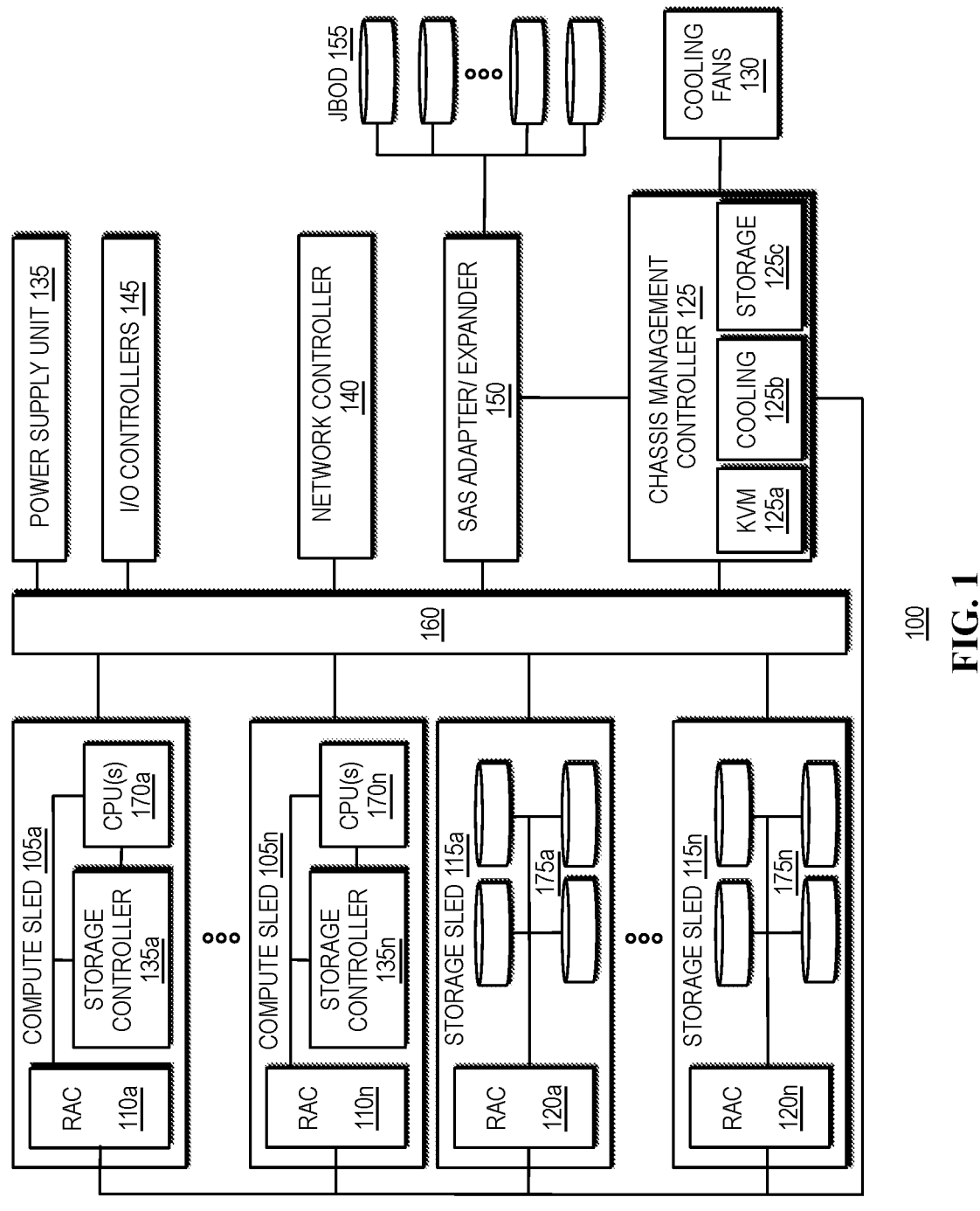
FIG. 1 is a diagram illustrating certain components of a chassis, according to some embodiments, for supporting validation of flexible configurations of hardware components of IHSs installed in the chassis.

FIG. 1 is a block diagram illustrating certain components of a chassis 100 comprising one or more compute sleds 105a-n and one or more storage sleds 115a-n that may be configured to implement the systems and methods described herein for supporting validation of flexible configurations of hardware components of IHSs installed in the chassis 100. Embodiments of chassis 100 may include a wide variety of different hardware configurations. Such variations in hardware configuration may result from chassis 100 being factory assembled to include components specified by a customer that has contracted for manufacture and delivery of chassis 100. Upon delivery of an chassis 100, the chassis and/or individual IHS sleds installed in the chassis 100, may be modified by replacing various hardware components or by installing new hardware components.

As described in additional detail below, chassis 100 may include capabilities that allow a customer to validate that hardware detected in chassis 100 is the same factory installed and provisioned hardware that was supplied to the customer. In addition, embodiments support secure modifications to chassis 100. Once chassis 100 is delivered and deployed, various hardware modifications may be made over time in order to support the requirements of a specific deployment, or to replace or augment the factory-installed hardware. In some instances, these operations may involve movement of replaceable hardware components, such as between chassis 100 and another chassis configured according to embodiments. Various replaceable hardware components may be supported by chassis 100, where these replaceable hardware components may be repeatedly added and removed from chassis 100 by administrators. However, other hardware components installed in chassis 100 may be deemed required hardware components that should not be removed from the chassis 100. Accordingly, embodiments supports secure modifications to flexible configurations of optional and required hardware components of chassis 100. Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135. In some embodiments, a backplane 160 may be uniquely identified based on a code or other identifier that may be permanently encoded in a non-volatile memory of the backplane 160 by its manufacturer. As described below, embodiments may support validation of backplane 160 as being the same backplane that was installed at the factory during the manufacture of chassis 100. Based on the integral nature of backplane 160 to core functions supported by chassis 100, in some embodiments, backplane 160 may be designated as a non-replaceable, required component of chassis 100.

Figure 2:
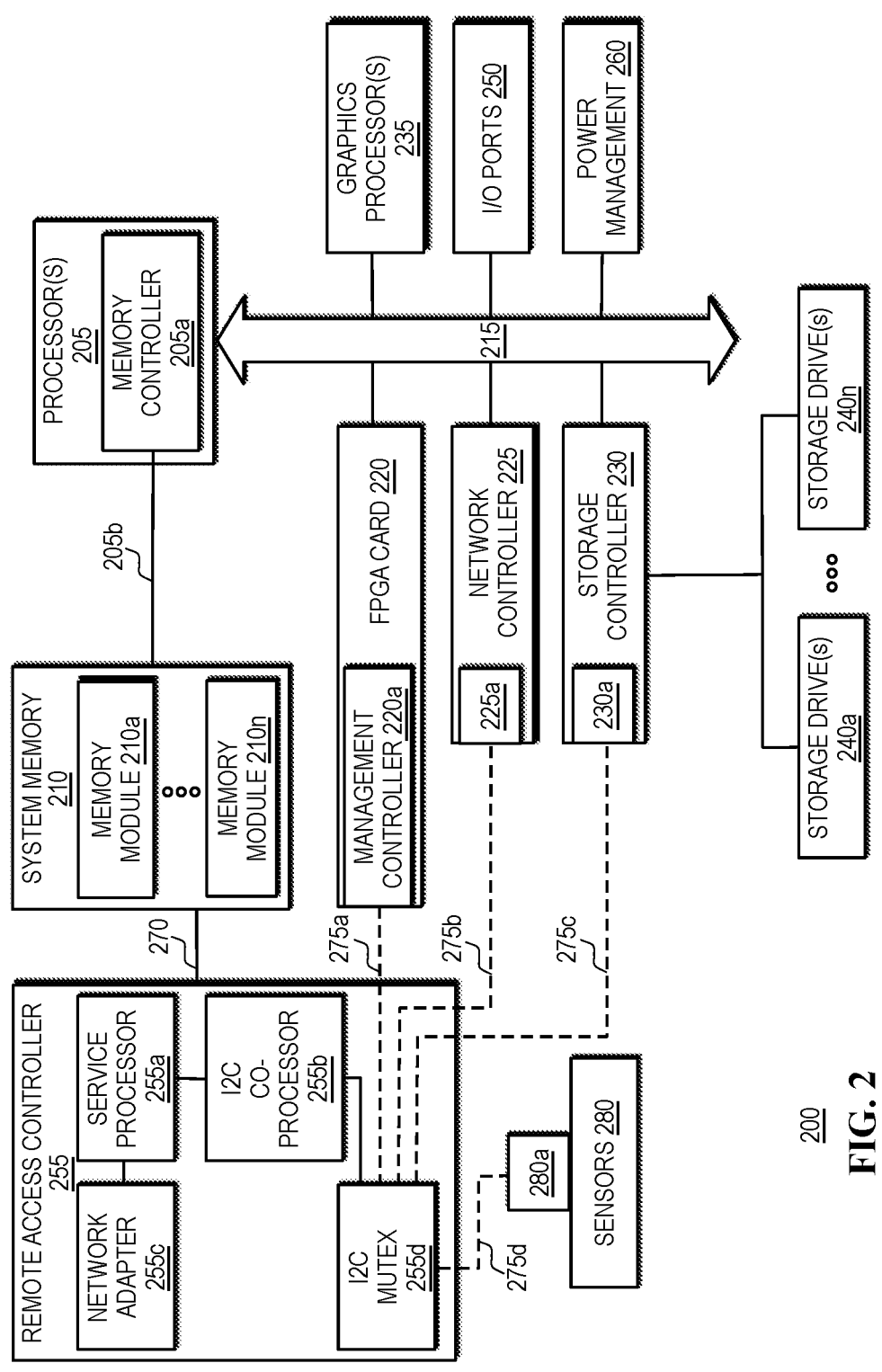
FIG. 2 is a diagram illustrating certain components of an IHS configured, according to some embodiments, for supporting validation of flexible configurations of hardware components installed in the IHS.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. Remote access controllers 110a-n may collect various types of sensor data, such as collecting temperature sensor readings that are used in support of airflow cooling of the chassis 100 and the sleds 105a-n, 115a-n. In addition, each remote access controller 110a-n may implement various monitoring and administrative functions related to compute sleds 105a-n that utilize sideband bus connections with various internal components of the respective compute sleds 105a-n. In light of the variety of computing tasks that may be implemented using compute sleds 105a-n, in some embodiments, some individual compute sleds 105a-n may designated as optional components of chassis 100, while other compute sleds may be designated as required components of chassis 100.

Each of the compute sleds 105a-n may include a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located. In some embodiments, a SAS expander 150 and storage drive 155 may be uniquely identified based on a code or other identifier that may be permanently encoded in a non-volatile memory of the SAS expander 150 or storage drive 155 by its respective manufacturer. In instances where SAS expander 150 and storage drives 155 are factory installed, as described below, embodiments may support validation of SAS expander 150 and storage drives 155 as being the same SAS expander and storage drives that were installed at the factory during the manufacture of chassis 100.

In some embodiments, these storage drives 155 may be designated as replaceable hardware components of chassis 100. In some configurations, some or all of the IHSs (e.g., compute sleds 105a-n and storage sleds 115a-n) installed in chassis 100 may have access to these replaceable storage drives 155. As described in additional detail below, embodiments may further support secure validation of addition or removal of individual replaceable storage drives 155 using factory-provisioned inventory certificates that are maintained by each of the IHSs (e.g., compute sleds 105a-n and storage sleds 115a-n) installed in the chassis 100, where individual storage drives may be designated as optional hardware components of chassis 100. In some embodiments, however, SAS expander 150 may be designated as a required component of chassis 100. Accordingly, embodiments support validation of modifications to chassis 100, where modifications may be validated based on whether components have been designated as optional and required components of the chassis 100.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100. As illustrated, each storage sled 115a-n includes a remote access controller (RAC) 120a-n provides capabilities for remote monitoring and management of respective storage sleds 115a-n. In some embodiments, each storage sled 115a-n may be uniquely identified based on a code or other identifier that may be permanently encoded in a non-volatile memory of the respective storage sled 115a-n by its manufacturer. As described below, embodiments support validation of each storage sled 115a-n as being a storage sled that was installed at the factory during the manufacture of chassis 100. In light of the variety of data storage tasks that may be implemented using each storage sleds 115a-n, in some embodiments, some of the individual each storage sleds 115a-n may each be designated as required components of chassis 100, while other storage sleds may be designed as optional components of chassis 100.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. In some embodiments, a network controller 140 may be uniquely identified based on a code or other identifier that may be permanently encoded in a non-volatile memory of the network controller 140 by its manufacturer. As described below, embodiments support validation of network controller 140 as being the same network controller that was installed at the factory during the manufacture of chassis 100. In some embodiments, network controller 140 may be a replaceable hardware component of chassis 100, where an administrator may be able to swap network controllers installed in dedicated networking bays of chassis 100. In support of such swapping, in some embodiments, network controller 140 may be designated as an optional components of chassis 100. However, even if network controller 140 can be swapped out of chassis 100, in some embodiments, network controller 140 may nonetheless be designated as a required component of chassis 100, such as due to network controller 140 being used to implement specialized security protocols. As described in additional detail below, in some embodiments, the designation of network controller 140 as a required component may specify that a network controller is required, but it can be replaced with a compatible network controller, such as a network controller of the same model as the factory-provisioned network controller specified in the inventory certificate.

Chassis 100 may similarly include one or more power supply units 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with multiple redundant, hot-swappable power supply units. In some embodiments, a power supply unit 135 may be uniquely identified based on a code or other identifier that may be permanently encoded in a non-volatile memory of the power supply unit 135 by its manufacturer. As described below, embodiments support validation of power supply unit 135 as being the same power supply unit that was installed at the factory during the manufacture of chassis 100.

In some embodiments, power supply unit 135 may be a replaceable hardware component of chassis 100, where an administrator may be able to swap power supply units 135 installed in dedicated power bays of chassis 100. As described in additional detail below, embodiments may further support secure validation of addition or removal of individual power supply units 135 of chassis 100 through a factory-provisioned inventory certificates that are maintained by each of the IHSs installed in the chassis 100. During factory provisioning, power supply unit 135 may be designated as a required or optional component of chassis 100. In some embodiments, the designation of power supply unit 135 as a required component may specify that a power supply unit is required, but it can be replaced with a compatible power supply unit, such as a power supply unit with the same power rating as the factory-provisioned power supply unit 135 specified in the inventory certificate.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125*a* capabilities that provide administrators with the ability to interface with the chassis 100. In some embodiments, each I/O controller 140 may be uniquely identified based on a code or other identifier that may be permanently encoded in a non-volatile memory of the respective I/O controller 140 by its manufacturer. As described below, embodiments support validation of I/O controllers 140 as being the same I/O controllers that were installed at the factory during the manufacture of chassis 100. As described in additional detail below, embodiments may further support secure validation of the replacement, removal or addition of an I/O controller

140. In some embodiments, some or all of the I/O controllers 140 may each be designated as optional and required components of chassis 100.

The chassis management controller 125 may also include a storage module 125*c* that provides capabilities for managing and configuring certain aspects of the storage devices of chassis 100, such as the storage devices provided within storage sleds 115*a-n* and within the JBOD 155. In some embodiments, a chassis management controller 125 may be uniquely identified based on a code or other identifier that may be permanently encoded in a non-volatile memory of the chassis management controller 125 by its manufacturer. As described below, embodiments support validation of chassis management controller 125 as being the same chassis management controller that was installed at the factory during the manufacture of chassis 100. In some embodiments, chassis management controller 125 may be designated as a required component of chassis 100, where this requirement further specifies that only the exact chassis management controller 125 specified in the factory-provisioned inventory certificate will be accepted in satisfying this requirement.

In addition to providing support for KVM 125*a* capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125*b* of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for supporting validation of flexible configurations of hardware components installed in the IHS 200. It should be appreciated that although the embodiments described herein may describe an IHS that is a compute sled or similar computing component that may be deployed within the bays of a chassis, other embodiments may be utilized with other types of IHSs that may also support validation of the secure assembly and delivery of the IHS 200, and further support secure modifications to the hardware components that are installed in IHS 200. In the illustrative embodiment of FIG. 2, IHS 200 may be a computing component, such as compute sled 105a-n or other type of server, such as an 1RU server installed within a 2RU chassis, that is configured to share infrastructure resources provided by a chassis 100. In some instances, shared infrastructure resources of chassis 100 may be implemented using hardware components of the chassis 100 that are accessible by IHS 200.

As described, an IHS 200 may be assembled and provisioned according to customized specifications provided by a customer. The IHS 200 of FIG. 2 may be a compute sled, such as compute sleds 105a-n of FIG. 1, that may be installed within a chassis, that may in turn be installed within a rack. Installed in this manner, IHS 200 may utilize shared power, network and cooling resources provided by the chassis and/or rack. Embodiments of IHS 200 may include a wide variety of different hardware configurations. Such variations in hardware configuration may result from IHS 200 being factory assembled to include components specified by a customer that has contracted for manufacture and delivery of IHS 200. As described in additional detail below, IHS 200 may include capabilities that allow a customer to validate that the hardware components of IHS 200 are the same hardware components that were installed at the factory during its manufacture, where these validations of the IHS hardware may be initially completed using a factory-provisioned inventory certificate.

As described in additional detail below, IHS 200 may include capabilities that allow a customer to validate that is hardware detected as installed IHS 200 is the same factory installed and provisioned hardware that was supplied to the customer. In addition, embodiments support secure modifications to IHS 200, such as by an administrator that adds or removes replaceable hardware components that are supported by IHS 200, where these replaceable hardware components may be repeatedly added and removed from IHS 200 by administrators. Embodiments support secure modifications involving adding, removing and/or replacing hardware components of IHS 200. As described with regard to chassis 100, various factory-installed hardware components of IHS 200 may be designated as replaceable, optional components, while others may be designated as non-replaceable, required components. In some embodiments, these designations of hardware components may be specified in the factory-provisioned inventory certificate of IHS 200. Through the use of this inventory certificate, the hardware components that are detected by IHS 200 may be confirmed as an allowed configuration of replaceable and non-replaceable hardware components.

IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications. In some embodiments, each of the processors 205 may be uniquely identified based on a code or other identifier that may be permanently encoded in a respective processor 205 by its manufacturer. As described below, embodiments support validation of processors 205 as being the same processors that were installed at the factory during the manufacture of IHS 200.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b. The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as static RAM (SRAM), dynamic RAM (DRAM), NAND Flash memory, suitable for supporting high-speed memory operations by the processor (s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory. In some embodiments, each of the memory modules 210a-n may be uniquely identified based on a code or other identifier that may be permanently encoded in a respective memory module 210a-n by its manufacturer. As described below, embodiments support validation of memory modules 210a-n as being the same memory modules that were installed at the factory during the manufacture of IHS 200. In some embodiments, memory modules 210a-n may be designated during factory provisioning of IHS 200 as replaceable, optional hardware components of the IHS. However, in some embodiments, one or more of the memory modules 210a-n may instead be designated as required components of the IHS, even if they can be physically decoupled and removed from IHS, such as due to an individual memory module being used to implement a secure memory that is used in the validation of detected hardware. In some embodiments, the designation of individual memory modules 210a-n as required components may specify the that a memory module can be replaced with another memory module of the same specifications. In this manner, the requirement set forth in the inventory certificate enforces use of a specific number of memory modules of the same specifications as the factory-installed memory modules 210a-n.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more in-band buses 215. Various embodiments may utilize any number of buses to provide the illustrated pathways served by in-band bus 215. In certain embodiments, in-band bus

215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources and/or other peripheral components.

As illustrated, IHS 200 may include one or more FPGA (Field-Programmable Gate Array) cards 220. Each of the FPGA card 220 supported by IHS 200 may include various processing and memory resources, in addition to an FPGA logic unit that may include circuits that can be reconfigured after deployment of IHS 200 through programming functions supported by the FPGA card 220. Through such reprogramming of such logic units, each individual FGPA card 220 may be optimized to perform specific processing tasks, such as specific signal processing, security, data mining, and artificial intelligence functions, and/or to support specific hardware coupled to IHS 200. In some embodiments, a single FPGA card 220 may include multiple FPGA logic units, each of which may be separately programmed to implement different computing operations, such as in computing different operations that are being offloaded from processor 205. The FPGA card 220 may also include a management controller 220a that may support interoperation with the remote access controller 255 via a sideband device management bus 275a. In some embodiments, each of the FPGA cards 220 installed in IHS 200 may be uniquely identified based on a code or other identifier that may be permanently encoded in the FPGA card 220 by its manufacturer. As described below, embodiments support validation of FPGA card 220 as being the same FPGA card that was installed at the factory during the manufacture of IHS 200. In embodiments, FPGA card 220 may be designated during factory provisioning as an optional hardware component of IHS 200, or may instead be designated as a required component of the IHS, such as due to FPGA card 220 being programmed to implement specialized security protocols. As described in additional detail below, in some embodiments, the designation of FPGA card 220 as a required component may specify that a network controller is required and cannot be replace with another other FPGA card, such that only the exact FPGA specified in the factory-provisioned inventory certificate will satisfy this requirement.

Processor(s) 205 may also be coupled to a network controller 225 via in-band bus 215, such as provided by a Network Interface Controller (NIC) that allows the IHS 200 to communicate via an external network, such as the Internet or a LAN. In some embodiments, network controller 225 may be a replaceable expansion card or adapter that is coupled to a motherboard connector of IHS 200. In some embodiments, network controller 225 may be an integrated component of IHS 200. In some embodiments, network controller 225 may be uniquely identified based on a code or other identifier, such as a MAC address, that may be permanently encoded in a non-volatile memory of network controller 225 by its manufacturer. As described below, embodiments support validation of network controller 225 as being the same network controller that was installed at the factory during the manufacture of IHS 200. In some embodiments, network controller 225 may be designated during factory provisioning of IHS 200 as an optional hardware component of the IHS, or may instead be designated as a required component of the IHS, such as due to network controller 225 being used to implement proprietary network protocols. As described in additional detail below, in some embodiments, the designation of network controller 225 as a required component may specify that a network controller is required, but it can be replaced with a compatible network controller, such as a network controller of the same model as the factory-provisioned network controller 225 specified in the inventory certificate.

IHS 200 may include one or more storage controllers 230 that may be utilized to access storage drives 240a-n that are accessible via the chassis in which IHS 100 is installed. Storage controller 230 may provide support for RAID (Redundant Array of Independent Disks) configurations of logical and physical storage drives 240a-n. In some embodiments, storage controller 230 may be an HBA (Host Bus Adapter) that provide more limited capabilities in accessing physical storage drives 240a-n. In some embodiments, storage drives 240a-n may be replaceable, hot-swappable storage devices that are installed within bays provided by the chassis in which IHS 200 is installed. In embodiments where storage drives 240a-n are hot-swappable devices that are received by bays of chassis, the storage drives 240a-n may be coupled to IHS 200 via couplings between the bays of the chassis and a midplane of IHS 200. In some embodiments storage drives 240a-n may also be accessed by other IHSs that are also installed within the same chassis as IHS 100. Storage drives 240a-n may include SAS (Serial Attached SCSI) magnetic disk drives, SATA (Serial Advanced Technology Attachment) magnetic disk drives, solid-state drives (SSDs) and other types of storage drives in various combinations.

As described below, embodiments support validation of storage drives 240a-n as being the same storage drives installed at the factory during the manufacture of IHS 200. In some embodiments, each individual storage controller 230 and storage drive 240a-n may be uniquely identified based on a code or other identifier that may be permanently encoded in a non-volatile memory of the component by its manufacturer. As described below. Embodiments support validation of storage controller 230 and storage drives 240a-n as being the same storage controller and storage drives that were installed at the factory during the manufacture of IHS 200. In some embodiments, some or all of storage drives 240a-n may be designated during factory provisioning of IHS 200 as replaceable hardware components of the IHS. However, in some embodiments, one or more of the storage drives 240a-n may instead be designated as required components of the IHS, even if they can be physically decoupled and removed from IHS, such as due to a storage drive being used to store protected information that cannot be replicated. In other embodiments, an individual storage drive 240a-n may be designated as a required component, but one that can be replaced with another storage drive of the same model or specifications, thus ensuring that the IHS always operates with a minimum storage drive capacity. Embodiments may support secure validation of the replacement, removal or addition of storage drives 240a-n from IHS 200, where individual storage drives 240a-n may be optional or required components of the IHS.

A variety of additional components may be coupled to processor(s) 205 via in-band bus 215. For instance, processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated component of the remote access controller 255 and may be utilized to support the display of diagnostic and administrative interfaces related to IHS 200 via display devices that are coupled, either directly or remotely, to remote access controller 255. In some embodiments, components such as power management unit 260 and graphics processor 235 may also be uniquely identified based on a code or other identifier that may be permanently encoded in a non-volatile memory of these components by their respective manufacturer. As described below, embodiments support designation of these components as required or optional hardware of IHS 200 and further supports validation of these components as being components that were installed at the factory during the manufacture of IHS 200.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255. As described in additional detail below, in some embodiments, BIOS may be configured to identify hardware components that are detected as being currently installed in IHS 200. In such instances, the BIOS may support queries that provide the described unique identifiers that have been associated with each of these detected hardware components by their respective manufacturers.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As described, IHS 200 may include a remote access controller 255 that supports remote management of IHS 200 and of various internal components of IHS 200. In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the operating system of IHS 200 (i.e., in a bare-metal state). In some embodiments, certain operations of the remote access controller 225, such as the described inventory certificate generation and validation operations, may operate using validated instructions, and thus within the root of trust of IHS 200.

In some embodiments, remote access controller 255 may be uniquely identified based on a code or other identifier that may be permanently encoded in a non-volatile memory of the remote access controller 255 by its manufacturer. As described below, embodiments support validation of remote access controller 255 as being the same controller that was installed at the factory during the manufacture of IHS 200. In some embodiments, the factory-installed remote access controller 255 may be designated as a required component of IHS 200 that cannot be replaced by any other remote access controller. Also as described below, during a provisioning phase of the factory assembly of IHS 200, a signed certificate that specifies factory installed hardware components of IHS 200 that were installed during manufacture of the IHS 200 may be stored in a non-volatile memory that is accessed by remote access controller 255. Using this signed inventory certificate stored by the remote access controller 255, a customer may validate that the detected hardware components of IHS 200 are the same hardware components that were installed at the factory during manufacture of IHS 200.

In support of the capabilities for validating the detected hardware components of IHS 200 against the inventory information that is specified in a signed inventory certificate, remote access controller 255 may support various cryptographic capabilities. For instance, remote access controller 255 may include capabilities for key generation such that remote access controller may generate keypairs that include a public key and a corresponding private key. As described in additional detail below, using generated keypairs, remote access controller 255 may digitally sign inventory information collected during the factory assembly of IHS 200 such that the integrity of this signed inventory information may be validated at a later time using the public key by a customer that has purchased IHS 200. Using these cryptographic capabilities of the remote access controller, the factory installed inventory information that is included in an inventory certificate may be anchored to a specific remote access controller 255, since the keypair used to sign the inventory information is signed using the private key that is generated and maintained by the remote access controller 255.

In some embodiment, the cryptographic capabilities of remote access controller 255 may also include safeguards for encrypting any private keys that are generated by the remote access controller and further anchoring them to components within the root of trust of IHS 200. For instance, a remote access controller 255 may include capabilities for accessing hardware root key (HRK) capabilities of IHS 200, such as for encrypting the private key of the keypair generated by the remote access controller. In some embodiments, the HRK may include a root key that is programmed into a fuse bank, or other immutable memory such as one-time programmable registers, during factory provisioning of IHS 200. The root key may be provided by a factory certificate authority, such as described below. By encrypting a private key using the hardware root key of IHS 200, the hardware inventory information that is signed using this private key is further anchored to the root of trust of IHS 200. If a root of trust cannot be established through validation of the remote access controller cryptographic functions that are used to access the hardware root key, the private key used to sign inventory information cannot be retrieved. In some embodiments, the private key that is encrypted by the remote access controller using the HRK may be stored to a replay protected memory block (RPMB) that is accessed using security protocols that require all commands accessing the RPMB to be digitally signed using a symmetric key and that include a nonce or other such value that prevents use of commands in replay attacks. Stored to an RPMG, the encrypted private key can only be retrieved by a component within the root of trust of IHS 200, such as the remote access controller 255.

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275a-d that may be individually established with each of the respective managed devices 220, 225, 230, 280 through the operation of an I2C multiplexer 255d of the remote access controller. As illustrated, certain of the managed devices of IHS 200, such as non-standard hardware 220, network controller 225 and storage controller 230, are coupled to the IHS processor(s) 205 via an in-line bus 215, such as a PCIe root complex, that is separate from the I2C sideband bus connections 275a-d used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255a of remote access controller 255 may rely on an I2C co-processor 255b to implement sideband I2C communications between the remote access controller 255 and managed components 220, 225, 230, 280 of the IHS. The I2C co-processor 255b may be a specialized co-processor or micro-controller that is configured to interface via a sideband I2C bus interface with the managed hardware components 220, 225, 230, 280 of IHS. In some embodiments, the I2C co-processor 255b may be an integrated component of the service processor 255a, such as a peripheral system-on-chip feature that may be provided by the service processor 255a. Each I2C bus 275a-d is illustrated as single line in FIG. 2. However, each I2C bus 275a-d may be comprised of a clock line and data line that couple the remote access controller 255 to I2C endpoints 220a, 225a, 230a, 280a which may be referred to as modular field replaceable units (FRUs).

As illustrated, the I2C co-processor 255b may interface with the individual managed devices 220, 225, 230, 280 via individual sideband I2C buses 275a-d selected through the operation of an I2C multiplexer 255d. Via switching operations by the I2C multiplexer 255d, a sideband bus connection 275a-d may be established by a direct coupling between the I2C co-processor 255b and an individual managed device 220, 225, 230, 280. In providing sideband management capabilities, the I2C co-processor 255b may each interoperate with corresponding endpoint I2C controllers 220a, 225a, 230a, 280a that implement the I2C communications of the respective managed devices 220, 225, 230. The endpoint I2C controllers 220a, 225a, 230a, 280a may be implemented as a dedicated microcontroller for communicating sideband I2C messages with the remote access controller 255, or endpoint I2C controllers 220a, 225a, 230a, 280a may be integrated SoC functions of a processor of the respective managed device endpoints 220, 225, 230, 280.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
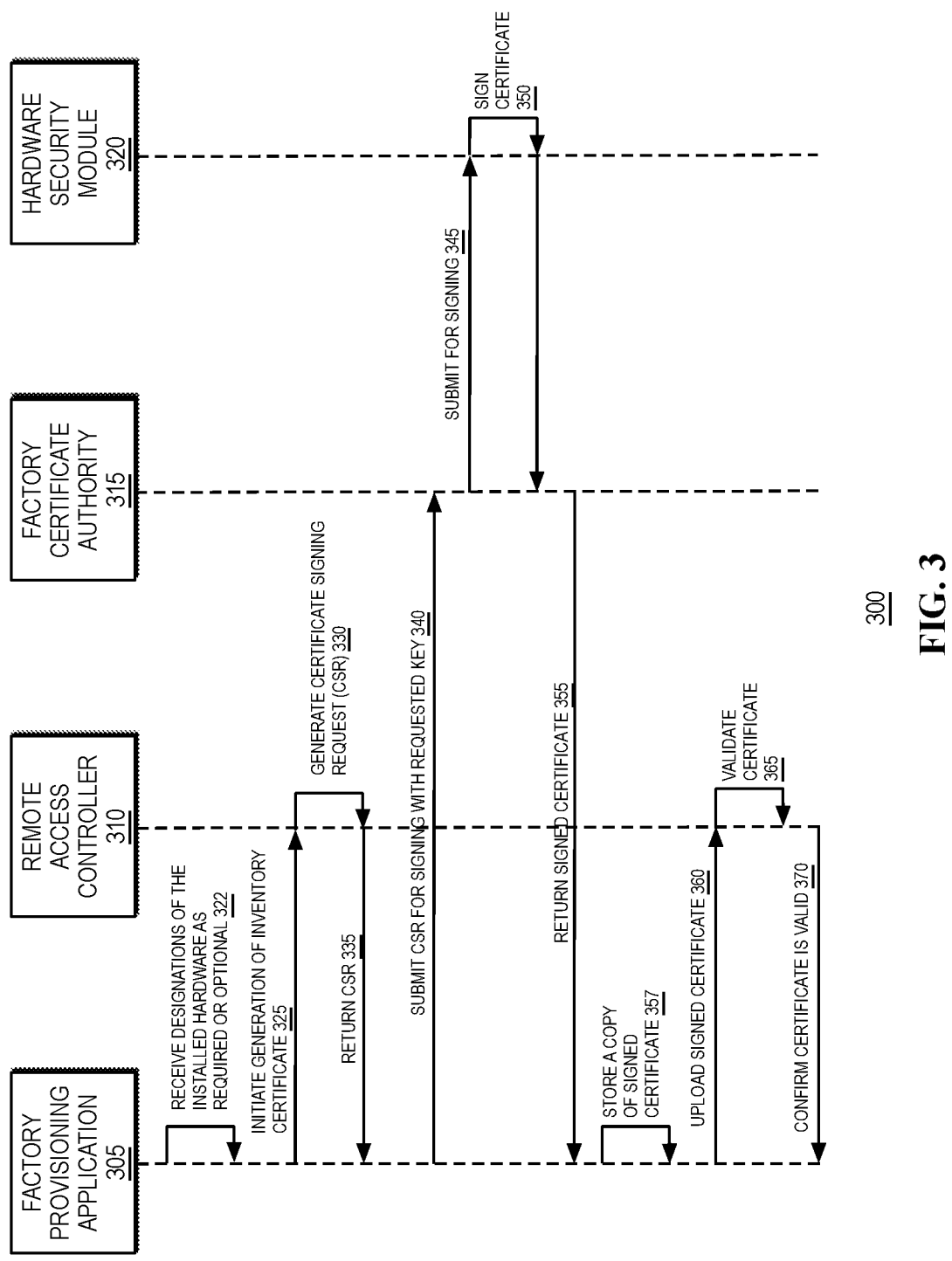
FIG. 3 is a swim lane diagram illustrating certain responsibilities of components of a system configured according to certain embodiments for factory provisioning of an IHS in a manner that supports validation of flexible configurations of hardware components installed in the IHS.

FIG. 3 is a swim lane diagram illustrating certain responsibilities of components of a system configured according to certain embodiments for factory provisioning of an IHS in a manner that supports validation of flexible configurations of hardware components installed in the IHS. FIGS. 4A-B are a flowchart describing certain steps of a method, according to some embodiments, for factory provisioning of an IHS in a manner that supports validation of flexible configurations of hardware components installed in the IHS. Some embodiments of the method of FIGS. 4A-B may begin, at block 405, with the factory assembly of an IHS, such as the assembly of a server described with regard to FIGS. 1 and 2. In some instances, an IHS may be manufactured using a factory process that includes multiple phases of assembly, validation and provisioning that must be completed before the IHS is supplied to a customer. As described, an IHS such as a server may be purpose-built for a particular customer such that the server is assembled and provisioned according to specifications provided by the customer. The initial factory assembly of such server IHSs may include the selection of a chassis and the fastening of various hardware components to the selected chassis. Such a factory assembly process may include generating a manifest that tracks the individual hardware components that are installed in an IHS. As described above, the installed hardware components may include standard components and may also include specialized components that have been requested by a specific customer that has contracted for the assembly and delivery of an IHS.

Once the assembly of an IHS has been completed, the IHS may be subjected to manual and automated inspections that confirm the IHS has been properly assembled and does not include any defects. After confirming an IHS has been assembled without any manufacturing defects, at block 410, factory provisioning of the IHS may be initiated. In some instances, the provisioning of an IHS at the factory may include various stages that may include stages for loading of firmware, configuring hardware components, and installing an operating system and other software. As indicated in FIG. 3, various aspects of this factory provisioning process may be conducted using a factory provisioning application 305, where this factory provisioning application may run on one or more servers and may interface with an IHS that is being provisioned once a requisite amount of firmware and software has been installed to the IHS.

As described, a manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. In some embodiments, this manifest may specify any available device attestations, such as device identity certificates, that can be used to cryptographically validate the authenticity of individual factory-installed hardware components of an IHS. At block 415, a manifest generated during assembly of an IHS is provided to the factory provisioning application 305 that is being used to provision the assembled IHS.

As described in additional detail below, in embodiments, validation of the IHS hardware as factory installed using an inventory certificate may be extended through the use of designations included in the inventory certificate for some or all of the factory-installed hardware components as either required or optional. In some embodiments, components designated as required may be further designated with restrictions on any modifications or replacement of the required component. In some embodiments, a required component may be further designated as requiring the exact factory-installed hardware component specified in the inventory certificate. Accordingly, such designations force use of a factory-installed hardware component in order to successfully validate the detected IHS hardware, with no replacements allowed for this required component. Such designations may be made to highly protected components and/or components within a root of trusted hardware of the IHS.

In some embodiments, components designated as required may be further designated with restrictions on replacement of a required component. In some embodiments, this additional designation may specify that the required component can be replaced with an identical component of the same model number as the component designated as required in the inventory certificate. For instance, in a high-performance hardware configuration that is expected to have significant power demands, the inventory certificate may specify that a pair of redundant, factory-installed power supply units are both required hardware components, thus requiring that both power supply units be detected and usable by the IHS in order to successfully validate the detected hardware components. However, the designation of these power supply units as required may further designate that validated replacements are allowed, as long as the replacement power supply unit is the same model number as the factory-installed power supply unit. In other embodiments, the additional designations for a required power supply unit may specify requirements that a replacement power supply unit must have the same power delivery specifications as the factory-installed power supply unit.

In some embodiments, this additional designation may specify that the required component can be replaced with an attestable component that is validated using its own device identity certificate, such as an SPDM (Security Protocols and Data Models) device identity certificate that may be issued by a manufacturer of a hardware component and can be used to attest the authenticity of the hardware. In such instances, embodiments may allow replacement of a required component, such as a network controller, but only as long as the replacement can be independently authenticated.

In some embodiments, this additional designation may specify that the required component can be replaced with an replacement component as long as it has a thermal rating within a specific range. Thermal ratings for hardware components may specified as ASHRAE (American Society of Heating, Refrigerating and Air-Conditioning Engineers) classifications. These ASHRAE classifications include an A1 rating, the most restrictive rating, for equipment that should be operated within operating temperature boundary requirements of 15 to 32 degrees Celsius at 20% to 80% relative humidity. These classifications also include an A2 rating for equipment that should be operated within operating temperature boundary requirements of 10 to 35 degrees Celsius at 20% to 80% relative humidity. Additional ratings specify increasingly less restricted thermal ratings for hardware components. In some embodiments, an additional designation for required hardware components may specify that the required component can be replaced with a component with an ASRAE classification that is the same or better than the factory-installed hardware that has been designated as required. In this manner, replacement of a hardware component that has been selected and installed for its thermal capabilities, such as a factory-installed, low-power AI graphics processor card, may be limited to replacements that satisfy the same thermal restrictions as the factory installed component.

In some embodiments, the hardware components that are designated as required in the inventory certificate may include trusted hardware of the IHS, and in particular hardware components that form a root of trusted IHS hardware. As described above, various hardware components of the IHS may be configured to operate with authenticated firmware instructions, such as firmware instructions validated against a trusted digital signature that was generated based on a trusted reference version of the firmware. In some embodiments, each of these trusted hardware components that operate using validated firmware may be deemed required hardware of the IHS that should not be removed from the IHS without causing a validation failure.

Through such designations, various different configurations of detected hardware components may be validated for operation by an IHS through the use of a factory-provisioned inventory certificate, where replacements for required components may be strictly prohibited, or may be allowed under certain conditions. In some embodiments, a manifest that specifies any required and/or optional hardware components that are installed in an IHS, and any restrictions and/or recovery operations for replacement of components designated as required, may also be generated during assembly of the IHS. Such a manifest may also be a file that includes individual entries for some or all of the hardware components factory installed to an IHS, where each entry may specify specific restrictions on the removal of installed hardware components that have been designated as required, and may specify any limitations or instructions on the removal or replacement of hardware components that have been designated as optional.

At block 418, the manifest specifying designations of installed hardware components as optional or required, and any restrictions and/or recovery operations for replacement of components designated as required, is provided to the factory provisioning application 305 that is being used to provision the assembled IHS. Based on this manifest of factory installed hardware and the manifest of optional and/or required hardware components, at block 420, the factory provisioning application 305 may also initiate the generation of an inventory certificate that may be used to validate that the detected hardware components of the IHS are the same hardware components that were installed during the factory assembly of the IHS, and may be used to validate whether any detected modifications to the factory-installed hardware conform to the flexible hardware configurations specified in the inventory certification via the designations of optional and/or required hardware components.

As described with regard to FIGS. 1 and 2, an IHS may include a remote access controller that provides capabilities for remote management of an IHS, where these remote management capabilities may include sideband management of various hardware components of an IHS. As indicated in FIG. 3, the generation of an inventory certificate and ledger certificate for a newly assembled IHS, at 325, may be initiated via a request from the factory provisioning application 305 to the remote access controller 310 of the IHS. As described with regard to FIG. 2, a remote access controller of an IHS may include cryptographic capabilities that operate within the root of trust of the IHS and that include the ability to generate cryptographic keypairs. Utilizing such cryptographic capabilities, at block 425, the remote access controller 310 initiates the generation of an inventory certificate by generating a cryptographic key pair for use in validating the authenticity of inventory information that is included in an inventory certificate, and of the included designations of optional and/or required hardware components.

At block 430 and at 330, the remote access controller 310 generates a certificate signing request (CSR) for a digital identity certificate, where the request specifies the public key of the key pair generated by the remote access controller and also specifies the factory installed hardware inventory from the manifest that was generated during assembly of the IHS, including the designations of optional and/or required hardware components. The factory installed hardware inventory information included in the CSR may be signed by the remote access controller using the private key from the generated keypair.

At block 435 and at 335, the CSR for the requested inventory certificate is transmitted to the factory provisioning application 305 by the remote access controller 310. At block 440, the remote access controller safeguards the private key from the generated key pair. In some embodiments, the remote access controller may encrypt the private key using the hardware root key (HRK) of the IHS and may store the encrypted key to a protected memory, such as the replay protected memory block that is described with regard to FIG. 2.

Upon receiving the certificate signing requests from the remote access controller 310, at block 445 and at 340, the factory provisioning application 305 submits the CSRs for signing by a factory certificate authority 315. In some embodiments, the factory provisioning application 305 specifies a factory key to be used by the factory certificate authority 315 in signing the inventory certificate. For instance, the factory provisioning application may include the name of a trusted certificate associated with a factory key as an attribute of the inventory certificate CSR that is transmitted to the factory certificate authority 315.

Upon receipt of the CSR for the inventory certificate, at block 450, the factory certificate authority parses from the CSR: the hardware inventory information, designations of optional and/or required hardware components, the public key generated by the remote access controller and the information specifying the requested signing key. Based on the information parsed from the CSR, the factory certificate authority generates a digital identity certificate, referred to herein as an inventory certificate, that is associated with the public key provided by the remote access controller and that specifies the factory installed hardware inventory of the IHS, and designations for optional and/or required hardware components of the IHS.

As indicated in FIG. 3, at 345, the factory certificate authority 315 submits the generated inventory certificate for signing by a hardware security module 320 that may be a dedicated hardware component of a factory provisioning server that safeguards cryptographic keys and implements cryptographic functions utilized in the factory provisioning process. In some embodiments, the factory certificate authority 315 may also specify a certificate name associated with a signing key that is maintained by the hardware security module 320. At 350, the hardware security module 320 utilizes the private key associated with the specified certificate in order to digitally sign the submitted inventory certificate, which includes the inventory of the factory installed hardware components of the IHS and designations of optional and/or required hardware components. The signed certificate is then returned to the factory certificate authority 315 by the hardware security module 320.

Once the certificate has been signed, at block 460 and at 355, the signed certificate is transmitted from the factory certificate authority 315 to the factory provisioning application 305. As indicated in FIG. 3 at 357, the factory provisioning application 305 may store a copy of the signed certificate. In some instances, the copy may be saved to a data store utilized in providing ongoing support of the IHS once it has been shipped and has been deployed by a customer.

At block 465 and at 360, the signed inventory certificate is loaded to the assembled IHS. As indicated in FIG. 3, in some embodiments, the signed certificates may be uploaded to a remote access controller 310 of the assembled IHS, such that the signed inventory certificate may be stored to a nonvolatile memory or other persistent storage that is accessible by the remote access controller 310 independent from the operating system of the IHS. In other embodiments, the signed certificate may be uploaded without reliance on the remote access controller to another non-volatile memory of the IHS.

Some embodiments may continue, at 365, with the validation of the signed certificate by the remote access controller 310. Using the private key from the generated keypair used in generating the CSR for each certificate, at block 470, the remote access controller decrypts the signatures included by the remote access controller in the CSR and confirms that the inventory information and designations of optional and/or required hardware components included in the signed certificates matches the information that was submitted in the certificate signing request, thus validating the integrity of the generation of the signed certificates. At block 472, the remote access controller confirms that the signed certificate is valid and, at 370, the remote access controller 310 confirms the validity of the certificate with a notification to the factory provisioning application 305. With the generation and validation of the inventory certificate completed, additional factory provisioning of the assembled IHS may be completed and, at block 490, the assembled IHS may be shipped from the factory to the customer.

Upon delivery of the IHS, embodiments provide a customer with the capability of validating that the delivered IHS includes only hardware components that were installed at the factory during manufacture of the IHS. Embodiments thus support an initial validation of the secure assembly and delivery of an IHS. Such validations may be repeated each time an IHS is initialized, or in response to detected security conditions. As described, some of the hardware of an IHS are replaceable hardware components that are expected to be removed from the IHS and replaced, or re-installed at a later time. In addition, factory-installed hardware may be replaced due to failures or other faults in these components. However, as described, some components may be designated as required, such that validation requires the factory-installed hardware component to be detected, where additional designations for required components specify restrictions on replacing the component. In this manner, the factory-provisioned inventory certificate may be used in specifying flexible configurations of hardware components that can be validated as authentic.

Figure 5:
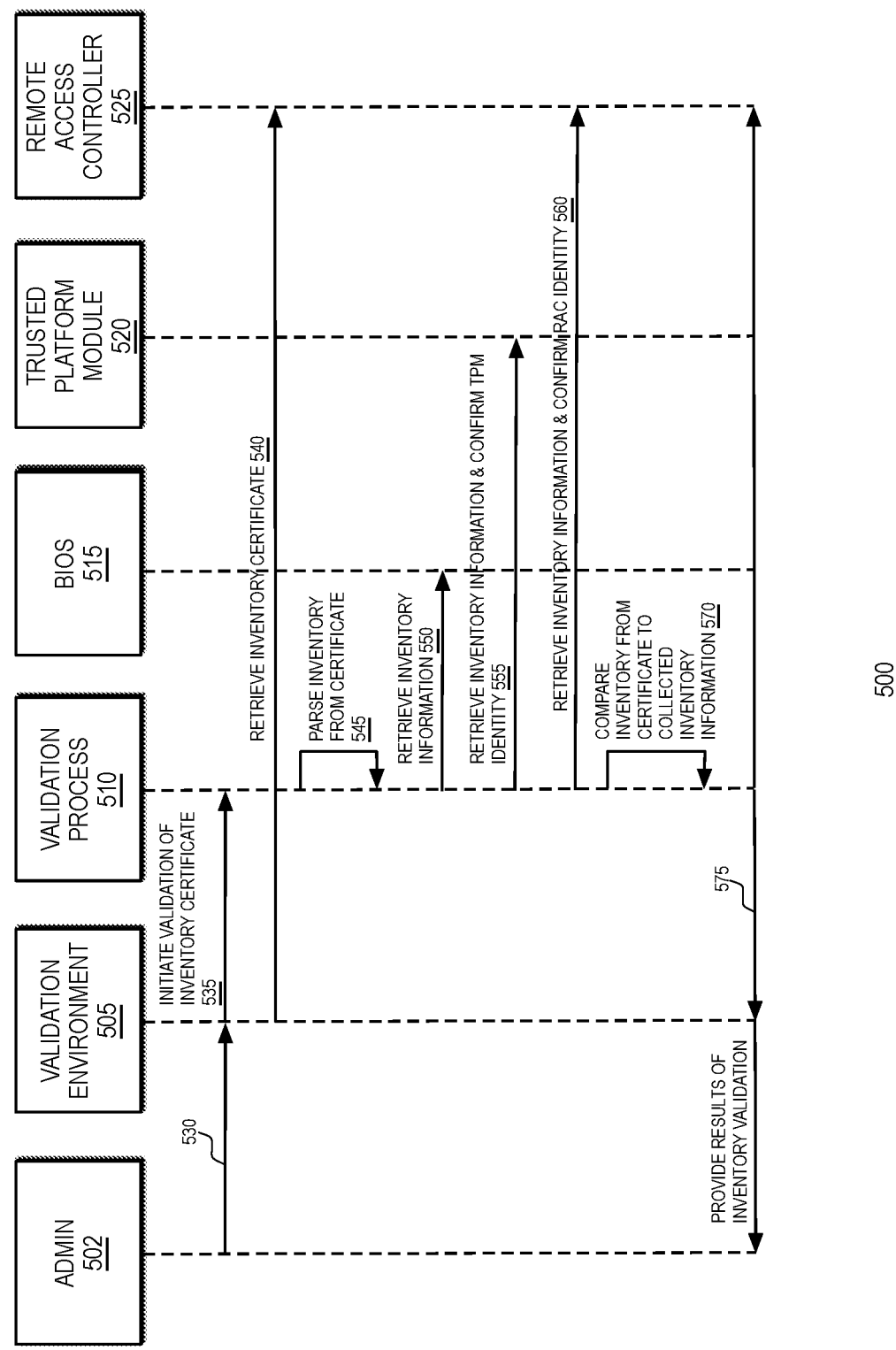
FIG. 5 is a swim lane diagram illustrating certain responsibilities of components of a system configured according to certain embodiments for validation of flexible configurations of hardware components installed in the IHS.

FIG. 5 is a swim lane diagram illustrating certain responsibilities of components of an IHS configured according to certain embodiments for use of an inventory certificate in the validation of flexible configurations of hardware components installed in the IHS. FIG. 6 is a flowchart describing certain steps of a method, according to some embodiments, for use of an inventory certificate in the validation of flexible configurations of hardware components installed in the IHS. Embodiments may begin with the delivery of an IHS that has been assembled and provisioned according to the procedures set forth above. In particular, the delivered IHS has been provisioned at the factory to include a signed inventory certificate that specifies the factory installed hardware components of the IHS, and designations of optional and/or required hardware components, and any restrictions and/or recovery operations for replacement of components designated as required.

Upon receiving an IHS configured in this manner, the IHS may be unpacked, assembled and initialized by an administrator 502. In some instances, an IHS may be ready for immediate deployment by a customer. In other instances, an IHS may require further provisioning by customer before it is deployed, such as for operation within a particular data center. As such, in various instances, an IHS may be unpacked, assembled and initialized in order to deploy the IHS or to prepare it for further provisioning.

At block 605, the IHS has been powered and validation process is initialized. In some instances, the validation process may be initialized as part of the initial provisioning of an IHS by a customer. In other instances, the validation process may be initialized, at 530, by an administrator as part of an onboarding procedure for configuring modifications to the hardware of the IHS. In some embodiments, the validation process may run within a pre-boot environment, such as a PXE (Preboot execution Environment) operating environment. In some embodiments, a PXE operating environment in which a validation process runs may be retrieved from a network location and may thus be executed using the processing and memory capabilities of the IHS. In some embodiments, a PXE operating environment may be retrieved using secure protocols, such as HTTPS, in order to assure the integrity of the operating environment instructions that are utilized. In some embodiments, a pre-boot operating environment in which the validation process runs may include an operating environment that is executed by the remote access controller of the IHS based on validated firmware instructions. In these embodiments that utilize a pre-boot operating environment, the validation of the detected hardware components of the IHS is conducted prior to booting of the operating system of the IHS.

In some embodiments, the validation process may run as part of a diagnostic mode that is supported by an IHS. For instance, an IHS may support a diagnostic mode that may be initiated by a user or may be initiated automatically in response to detecting various conditions, where the diagnostic mode may support various diagnostic tools, including the described hardware validation procedures. In some embodiments, the diagnostic mode may involve re-booting the IHS to a diagnostic environment, while other embodiments may support diagnostic mode operations that run within the operating system of the IHS. Accordingly, some embodiments may support the described hardware validation procedures as a feature available within the operating system of the IHS. In such embodiments, the operating system may be configured to periodically conduct the described hardware validation procedures, such as on a daily or weekly basis. The operating system may likewise be configured to conduct the hardware validation procedures in response to a detected security notification, such as a notification that a process is attempting to access a protected resource. In some embodiments, the described validation procedures may be implemented remotely, such as via the described HTTPS protocols, where the remote validation procedures may rely both on information retrieved from the IHS via HTTPS and on remote information, such as information maintained by the manufacturer of the IHS or by an entity supporting the administration of the IHS.

As indicated at 535 of FIG. 5, an inventory certificate validation process 510 is initiated within a validation environment 505 that may include a pre-boot environment, a diagnostic environment or other environment supporting the validation process. In some embodiments, the inventory certificate validation process 510 operates based on validated instructions, such as based on instructions that, when used to calculate a hash value, are confirmed to correspond to a value stored in an immutable memory of the IHS during its factory provisioning. In this manner, the inventory certificate validation process 510 may be added to the root of trust of the IHS. At block 610 and as indicated at 540, the inventory certificate validation process 510 retrieves the signed inventory certificate from the remote access controller 525, or from a persistent memory of the IHS. As described above, the factory provisioning process may include uploading a signed original inventory certificate to the remote access controller or to a persistent memory of the IHS. At block 615 and at 545, the inventory certificate validation process 510 parses the hardware inventory information from the signed inventory certificate. Using the public key provided in the signed inventory certificate, the inventory validation process 510 may confirm the integrity of the inventory information that is included in the signed inventory certificate, including the designations of optional and/or required hardware components.

In some scenarios, the inventory certificate validation process 510 may commence by collecting an inventory of the detected hardware components of the IHS. In some instances, this collection of inventory information may be initiated earlier by the inventory certificate validation process, such as during initialization of the IHS. At block 620 and as indicated at 550, the inventory certificate validation process 510 may query the BIOS 515 of the IHS for an inventory of hardware components that have been detected by BIOS 515. At block 625 and as indicated at 555, the inventory certificate validation process 510 may retrieve additional hardware inventory information from a Trusted Platform Module (TPM) 520 of the IHS. In some instances, the TPM 520 may identify hardware components that are also identified by BIOS 515. However, in some instances, the TPM 520 may identify certain hardware components, such as secure memory modules, that are not identified by BIOS 515.

As described with regard to FIG. 2, a Trusted Platform Module may serve to establish an initial hardware root of trust in an IHS such that the hardware components within this root of trust operate using validated software instructions. Accordingly, in some embodiments, the inventory certificate validation process 510 may compare identity information for the detected TPM 520 against the TPM identity information that is parsed from the inventory certificate at block 545. In some instances, the detection of any discrepancies between the identity of the TPM specified in the inventory certificate and the identity reported by TPM 520 may result in terminating any further validation procedures.

At block 630, the validation process may confirm the identity of the detected TPM against the identity of the TPM reported in the signed inventory certificate. If the identity of the TPM is successfully validated, validation may continue at block 635. However, if the identity of the TPM is not validated, at block 690, the validation process may signal a core inventory validation failure since any discrepancies between the identity of the factory installed TPM and the TPM that has been detected signals a potential compromise in the root of trusted hardware components of the IHS.

At block 635 and as indicated at 560, the inventory certificate validation process 510 may retrieve additional hardware inventory and thermal information from a remote access controller 525 of the IHS. As with TPM 520, remote access controller 525 may provide redundant identification of some hardware components and may provide exclusive identification of other hardware components, such as internal memories, management controllers or logic units utilized by the remote access controller 525. As with TPM 520, in some embodiments, the inventory certificate validation process 510 may compare identity information for the detected remote access controller 525 against the remote access controller identity information that is parsed from the inventory certificate at block 545. In some instances, the detection of any discrepancies between the identity of the remote access controller specified in inventory certificate and the identity reported by remote access controller 525 may also result in terminating any further validation procedures.

At block 640, the validation process 510 may confirm the identity of the detected remote access controller against the identity of the remote access controller reported in the signed inventory certificate. If the remote access controller is successfully validated, validation may continue at block 645. Otherwise, if the identity of the remote access controller is not validated, at block 690, the inventory certificate validation process may signal a core inventory validation failure. As with the TPM, any discrepancies between the identity of the factory installed remote access controller and the remote access controller detected in the initialized IHS signals a potential compromise of the root of trust of the IHS. The inventory certificate validation process 510 may retrieve additional inventory from any other available data sources, such as directly from the processor of the IHS or from a chassis management controller of a chassis in which the IHS has been installed.

Figure 6B:
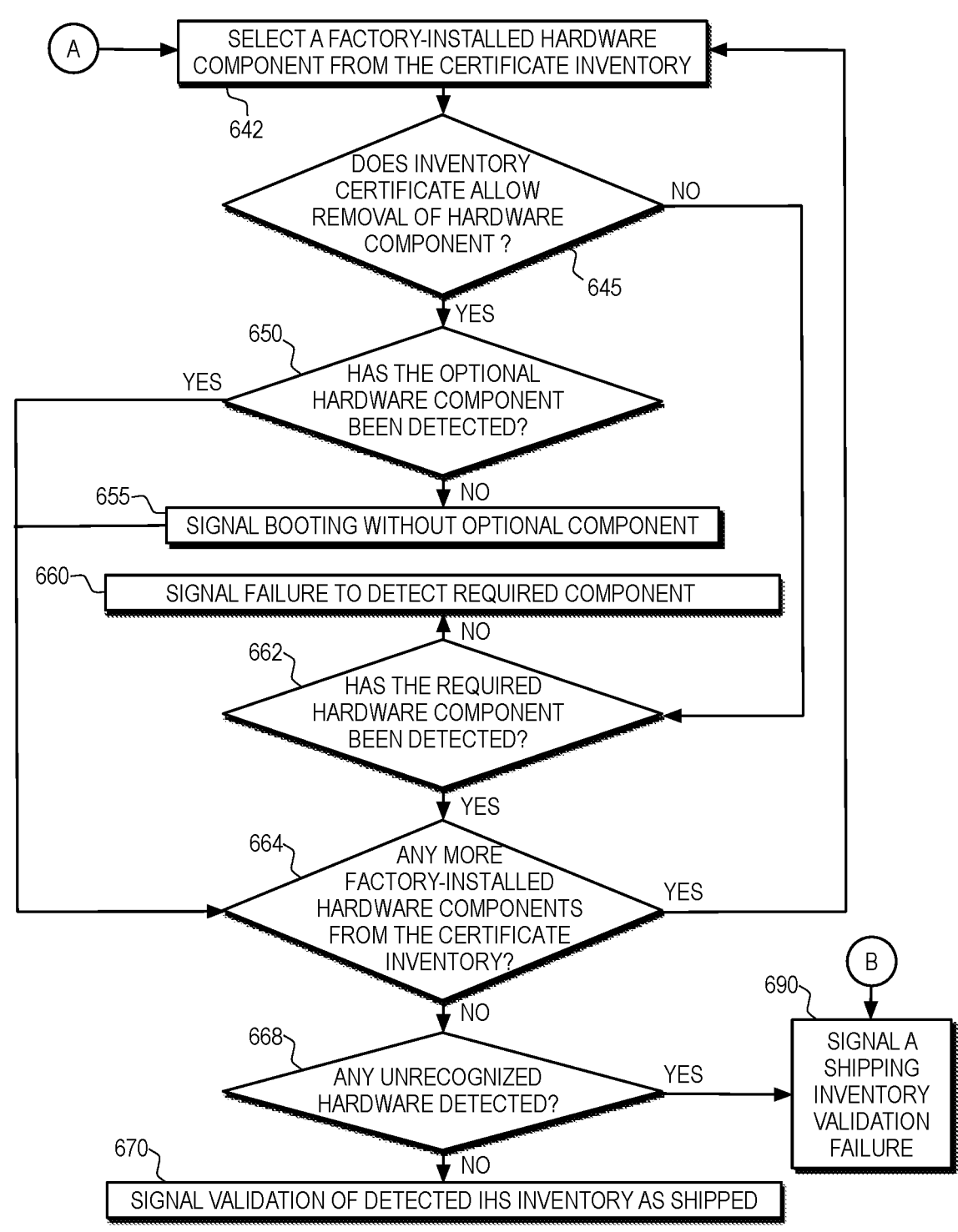
FIG. 6B is a flowchart that is a continuation of FIG. 6A.

Upon completion of the collection of information describing each of the detected hardware components of the initialized IHS, at block 570, the inventory certificate validation process begins comparisons of the detected components against the inventory information that is parsed from the signed inventory certificate. FIG. 6B describes the validation process in greater detail. In particular, embodiments may iterate through the inventory certificate information in order to determine whether modifications have been made to the factory installed of the IHS. Embodiments may thus continue, at 642, with the selection of a first of the factory installed hardware components from the signed inventory certificate.

As described above, the inventory certificate may be factory-provisioned to include designations for the individual factory-installed hardware as being either optional or required hardware components, where the components designated as required may be further designated with restrictions on any modifications or replacement of the required component. At 645, the validation process 510 determines, based on the factory-provisioned designations included in the inventory certificate, whether the selected hardware component is a required or optional component.

As described, some replaceable hardware components that are factory installed may be designated in the inventory certificate as optional components. For example, replaceable storage drives 240a-n that are used in a RAID configuration may be removed from IHS as part of normal reconfiguration of a RAID cluster of storage drives. In some instances, such RAID storage drives 240a-n provide redundant data storage such that none of these drives are considered required hardware of the IHS and would instead be designated as optional hardware. On the other hand, a hardware component such as non-redundant network controller 225 may be designated as a required component since IHS operations are severely compromised without the network controller, and/or due to the network controller implementing specialized security protocols that would be circumvented by its removal.

In scenarios where the selected hardware component from the inventory certificate has been designated as a required component, at 662, embodiments may determine whether the required components is one of the detected hardware components. In particular, the validation process 510 determines whether the unique identifiers specified in the inventory certificate for the selected hardware component match the identifiers for any of the detected hardware components. If the selected hardware component is designated as required and is determined to correspond to one of the detected hardware components, the validation process 510 confirms that the required component has been detected. Validation may continue, at 664, with the validation process 510 determining whether additional factory installed hardware specified in the inventory certificate remains to be evaluated. If there are remaining hardware components for evaluation in the inventory certificate, at 642, the validation process 510 selects another factory installed hardware component from the inventory certificate and continues validating the inventory certificate information against the detected hardware.

In some instances, at 662, a hardware component designated as required is not identified by the validation process 510 as one of the detected hardware components. Accordingly, at 660, the validation process 510 may signal a validation failure due to failure to detect a hardware component designated as required. In some embodiments, a validation failure due to failure to detect a required component may prevent further booting of the IHS, and may initiate various recovery operations. In some embodiments, the validation process 510 may notify the remote access controller 525 of the validation failure in order to halt further booting of the IHS. As described with regard to FIG. 2, the remote access controller 525 may support various diagnostic operations of the IHS and may control booting of the IHS, such as through manipulation of the power modes of the IHS. Also as described with regard to FIG. 2, the remote access controller 525 may manage various hardware components of the IHS, such as via sideband signaling pathways. In some embodiments, remote access controller 525 may halt further booting of specific hardware components by using sideband management connections to disable a managed hardware component. In response to a notification of a validation failure from the validation process 510, in some embodiments, the remote access controller 525 may issue notifications to local and remote administrators of the failure to boot the IHS due to a validation failure.

In some embodiments, recovery operations to be initiated in response to a failure to detect a required hardware component may be specified in the factory-provisioned inventory certificate as additional designations that specify requirements on replacement of these required hardware components. As described, the inventory certificate may be factory-provisioned with an inventory of factory installed hardware and designations for some or all of these components as optional and/or required, and any restrictions for replacement of components designated as required. In some embodiments, these additional restrictions may prohibit any replacement of a required hardware component, thus requiring the exact hardware that was factory-installed. In such instances, embodiments may signal a validation failure when a required component with such a restriction is not detected.

In some embodiments, these additional restrictions may allow replacement of a required hardware component, but only by a hardware component of the same model or of the same specifications or capabilities as the factory-installed hardware component. For instance, as described above, a power supply unit designated as required may include a restriction that allows replacement by a power supply unit of the same specifications, or of the same model number. In scenarios where a required hardware components is designated in the inventory certificate to allow such replacements, failure to detect the required component does not result in a validation failure if the validation process 510 identifies a delta certificate that authenticates the addition of an unrecognized component that replaces the required component per the restrictions in the inventory certificate. For example, the power supply unit that is required but not detected does not trigger a validation failure if a delta certificate is identified that validates the addition of power supply unit of the same model number or power specifications as the required unit that was not detected.

In this same manner, embodiments may support restrictions on replacement of hardware components designated as required based on thermal ratings restrictions set forth in the inventory certificate. For instance, in a constrained thermal environment and/or when operating with hardware with low thermal tolerances, embodiments may support restrictions on replacement of hardware components designated as required based on the thermal rating of the factory-installed component. For instance, in a scenario where the hardware component designated as required is not detected, the validation process 510 determines whether any delta certificate is available that validates replacement of this component and further determines whether the thermal rating, such as an A2 ASRAE classification, of the replacement components is the same or better than the thermal rating of the required component that was not detected.

For some or all of the hardware components that are designated as required, the inventory certificate be further provisioned with specific recovery operations to be conducted in situations where a required hardware component is not detected by the validation process 510. For instance, the recovery operations specified in the inventory certificate may specify halting of further booting of the IHS. The recovery operations specified in the inventory certificate may specify an administrative entity to be notified upon a validation failure. For example, in a scenario where a network controller 225 has been designated as a required component, the recovery operations specified in the inventory certificate may direct notifications to administrators within the data center. Based on these notifications, administrators can investigate and validate the discrepancy as a result of authentic administrative operations, thus triggering the generation of a delta certificate for use in validating this modification to the required factory installed hardware components.

In another scenario where an FPGA 200 has been designated as a required component, the recovery operations specified in the inventory certificate may direct notifications to an administrative entity that is responsible for this FPGA card. For instance, an FPGA 200 may be programmed to implement proprietary or other highly protected algorithms such that any possible tampering with this component should trigger a notification to an administrator that is external to the data center in which the IHS is located, and in particular to an administrator that is tasked with monitoring physical security of highly protected hardware such as the FPGA.

As described, the inventory certificate may include designations for hardware components as optional or required components of the IHS. Accordingly, in some instances, at 645, the validation process 510 determines that a hardware component selected from the inventory certificate is an optional component. For instance, an IHS may include factory installed sensors 280 the provide data describing the environmental conditions in which the IHS is operating. In some instances, such sensors 280 may be deemed optional components since the IHS may implement failover procedures for operation without any data from sensors 280. As described above, storage drives 240*a-n* may be designated as optional hardware components, such as when configured to provide redundant storage in RAID configurations. In some instances, memory modules 210*a-n* may be optional components as these components may be freely moved between IHSs.

Although failure to detect a hardware component that is designated as optional in the inventory certificate does not result in a validation failure, embodiments may restrict booting of the IHS without optional hardware components until the IHS is initially validated as received with all of the factory-installed hardware and no unrecognized hardware, thus ensuring the IHS was received as factory-provisioned and shipped. In such embodiments, the initial operation of the validation process 510 when the IHS has been received and initialized for the first time may disregard the designations set forth in the inventory certificate and may require the detection of the hardware components in the inventory certificate, with no unrecognized components. In this manner, embodiments may enable the validation of flexible configurations of hardware components, but only after the IHS has been validated to have been received as shipped, thus disabling the ability to boot the IHS without the hardware components designated as optional until this initial validation of the IHS has been completed. In some embodiments, the validation process 510 may instead implement a more relaxed requirement that only requires initial receipt and validation of the IHS as being received with all hardware designated as required, thus allowing modifications related to optional hardware components from the first boot of the IHS.

As illustrated in FIG. 6B, in scenarios where the selected hardware component from the inventory certificate is designated as an optional component, at 650, the validation process 510 determines whether that optional component has been detected. As for required hardware components, the validation process 510 determines whether the unique identifiers specified in the inventory certificate for the optional hardware component match the identifiers for any of the detected hardware components. If the optional hardware component is determined to correspond to one of the detected hardware components, the validation process 510 confirms that the optional component has been detected. Validation may continue, at 664, with the validation process 510 determining whether additional factory installed hardware specified in the inventory certificate remains to be evaluated. If there are remaining hardware components for evaluation in the inventory certificate, at 642, the validation process 510 selects another factory installed hardware component from the inventory certificate and continues validating the detected hardware against the inventory certificate.

As indicated in FIG. 6, in scenarios where an optional hardware component is not identified as one of the detected hardware components, at 655, the validation process 510 signals booting of the of the IHS without an optional hardware component. In some embodiments, the signal may include a notification to an administrator that the IHS has been validated, but is operating without one or more factory installed hardware components that have been designated as optional. As above, validation may continue, at 664, with the validation process 510 determining whether additional factory installed hardware specified in the inventory certificate remains to be evaluated. If there are remaining hardware components for evaluation in the inventory certificate, at 642, the validation process 510 selects another factory installed hardware component from the inventory certificate and continues validating the detected hardware against the inventory certificate.

In scenarios where, at 664, there are no more factory installed hardware component specified in the inventory certificate to be validated, all of the required hardware has been detected and some or all of the optional hardware has been detected. The validation process 510 continues, at 668, by determining whether any unrecognized hardware components have been detected. Any such unrecognized hardware components may have been added as part of a valid administrative operation, such as to add a graphics processor 235 that can be used by the IHS in offloading AI calculations. However, any such unrecognized hardware components may have been added by malicious actors, such as to add a redundant network controller 225 that has been configured to secretly record or redirect network communications. Validation process 510 embodiments thus confirm that no hardware components haven been detected that are not specified in the factory-provisioned inventory certificate, or through any available delta certificates that may be issued. If any unrecognized hardware components are detected, at 690, a validation failure may be signaled. As above, embodiments may halt booting of the IHS and may initiate various recovery operations in response to a validation failure resulting from detecting an unrecognized hardware component.

In scenarios where all of the required hardware specified in the inventory certificate is detected and no unrecognized hardware is detected, at block 670, the inventory validation process 510 signals a successful validation of the detected hardware of the IHS as including all required factory-installed hardware, some portion of the optional factory installed hardware, and no unrecognized hardware. The customer receiving delivery of the IHS is thus assured that the IHS is operating using only hardware components that were installed at the factory during manufacture of the IHS, with no additional hardware components detected.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An IHS (Information Handling System) comprising:
one or more processors;
one or more memory devices coupled to the processors, the memory devices storing computer-readable instructions that, upon execution by the processors, cause a validation process of the IHS to:
retrieve a factory-provisioned inventory certificate that specifies factory-installed hardware components of the IHS, wherein the inventory certificate comprises a designation for each of the factory-installed hardware components as required or optional;

identify a plurality of hardware components of the IHS that have been detected;

in response to determining that an optional hardware component designated as optional in the factory-provisioned inventory certificate is not present in the identified plurality of hardware components of the IHS, signal validation of the IHS without the optional hardware component; and in response to determining that a factory-installed hardware component specified in the factory-provisioned inventory certificate as required is not present in the identified plurality of hardware components of the IHS, signal a validation failure and prevent booting of the IHS.

2. The IHS of claim 1, wherein the factory-provisioned inventory certificate is stored to a persistent memory of the IHS during factory-provisioning of the IHS.

3. The IHS of claim 1, wherein the designation of a hardware component as required in the inventory certificate comprises a requirement for the exact factory-installed hardware component specified in the inventory certificate.

4. The IHS of claim 1, wherein the designation of a hardware component as required in the inventory certificate comprises a requirement for a compatible hardware component.

5. The IHS of claim 4, wherein the requirement for a compatible hardware component comprises a requirement for a specific model of hardware component.

6. The IHS of claim 4, wherein the requirement for a compatible hardware component comprises a requirement for a hardware component with a thermal rating within a specific range.

7. The IHS of claim 4, wherein the requirement for a compatible hardware component comprises a requirement for a hardware component that is identified by a device identity certificate.

8. The IHS of claim 1, wherein the factory-installed hardware components designated as required comprise hardware components that form a hardware root-of-trust of the IHS.

9. The IHS of claim 8, wherein the hardware root-of-trust of the IHS comprises hardware components that operate using validated firmware instructions.

10. The IHS of claim 1, wherein the signaling validation of the IHS without the optional hardware component is performed after the factory-provisioned inventory certificate is used to confirm all of the factory-installed hardware components designated as required are present.

11. The IHS of claim 10, wherein the signaling validation of the IHS without the optional hardware component is performed after the factory-provisioned inventory certificate is used to confirm all of the factory-installed hardware components designated as optional.

12. The IHS of claim 10, wherein booting of the IHS without an optional hardware component is disabled by a remote access controller of the IHS.

13. A method for validating hardware detected by an IHS (Information Handling System), the method comprising:

retrieving, by a validation process of the IHS, a factory-provisioned inventory certificate that specifies factory-installed hardware components of the IHS, wherein the inventory certificate comprises a designation for each of the factory-installed hardware components as required or optional;

identifying a plurality of hardware components of the IHS that have been detected;

in response to determining that an optional hardware component designated as optional in the factory-provisioned inventory certificate is not present in the identified plurality of hardware components of the IHS, signaling validation of the IHS without the optional hardware component; and in response to determining that a factory-installed hardware component specified in the factory-provisioned inventory certificate as required is not present in the identified plurality of hardware components of the IHS, signaling a validation failure and prevent booting of the IHS.

14. The method of claim 13, wherein the factory-provisioned inventory certificate is stored to a persistent memory of the IHS during factory-provisioning of the IHS.

15. The method of claim 13, wherein the designation of a hardware component as required in the inventory certificate comprises a requirement for the exact factory-installed hardware component specified in the inventory certificate.

16. The method of claim 13, wherein the designation of a hardware component as required in the inventory certificate comprises a requirement for a compatible hardware component.

17. The method of claim 13, wherein the factory-installed hardware components designated as required comprise hardware components that form a hardware root-of-trust of the IHS.

18. A non-transitory computer-readable storage device having instructions stored thereon for validating hardware detected by an IHS (Information Handling System), wherein execution of the instructions by one or more processors of the IHS causes a validation process of the IHS to:

retrieve a factory-provisioned inventory certificate that specifies factory-installed hardware components of the IHS, wherein the inventory certificate comprises a designation for each of the factory-installed hardware components as required or optional;

identify a plurality of hardware components of the IHS that have been detected;

in response to determining that an optional hardware component designated as optional in the factory-provisioned inventory certificate is not present in the identified plurality of hardware components of the IHS, signal validation of the IHS without the optional hardware component; and in response to determining that a factory-installed hardware component specified in the factory-provisioned inventory certificate as required is not present in the identified plurality of hardware components of the IHS, signal a validation failure and prevent booting of the IHS.

19. The non-transitory computer-readable storage device of claim 18, wherein the factory-provisioned inventory certificate is stored to a persistent memory of the IHS during factory-provisioning of the IHS.

20. The non-transitory computer-readable storage device of claim 18, wherein the designation of a hardware component as required in the inventory certificate comprises a requirement for the exact factory-installed hardware component specified in the inventory certificate.

* * * * *